US 8,295,480 B1

(12) United States Patent
Fagundes

(10) Patent No.: US 8,295,480 B1
(45) Date of Patent: Oct. 23, 2012

(54) UNCERTAINTY-BASED KEY AGREEMENT PROTOCOL

(75) Inventor: Luciano Godoy Fagundes, Sao Jose dos Campos (BR)

(73) Assignee: Avaya Inc., Basking Ridge, NJ (US)

( * ) Notice: Subject to any disclaimer, the term of this patent is extended or adjusted under 35 U.S.C. 154(b) by 1151 days.

(21) Appl. No.: 11/860,035

(22) Filed: Sep. 24, 2007

Related U.S. Application Data

(60) Provisional application No. 60/948,806, filed on Jul. 10, 2007.

(51) Int. Cl.
*H04L 29/06* (2006.01)
(52) U.S. Cl. ............ 380/44; 380/45; 380/47; 380/259; 380/260; 380/283; 380/284; 713/168; 713/171
(58) Field of Classification Search .................. 380/259, 380/260, 262, 277, 283, 284, 44, 47, 45; 713/168, 169, 171
See application file for complete search history.

(56) References Cited

U.S. PATENT DOCUMENTS

| 6,047,072 | A | * | 4/2000 | Field et al. .................. 380/283 |
| 7,333,611 | B1 | * | 2/2008 | Yuen et al. .................. 380/256 |
| 7,620,182 | B2 | * | 11/2009 | Berzanskis et al. .......... 380/256 |
| 2002/0188872 | A1 | * | 12/2002 | Willeby ........................ 713/202 |
| 2003/0215088 | A1 | * | 11/2003 | Bao .............................. 380/28 |

FOREIGN PATENT DOCUMENTS

WO WO 2006117806 A2 * 11/2006

OTHER PUBLICATIONS

Ozdemir et al., "Key establishment with source coding and reconciliation for wireless sensor networks," Performance, Computing, and Communications Conference, 2006. IPCCC 2006. 25th IEEE International , vol., no., pp. 8 pp. 414, Apr. 10-12, 2006.*
Damgard et al., "A Quantum Cipher with Near Optimal Key-Recycling", 2005, Advances in Cryptology—CRYPTO 2005, Lecture Notes in Computer Science, Springer Berlin / Heidelberg, pp. 494-510.*
"Characterizing Attacks," Wikipedia, the free encyclopedia, available at http://en.wikipedia.org/wiki/Cryptanalysis#Characterising_attacks, printed Feb. 9, 2008, 7 pages.
"Deutsch-Jozsa Algorithm," Web's Biggest website, available at http://web.archive.org/web/20050124143332/http://dirs.org/wiki-article-tab.cfm/deutsch_jozsa_algorithm, 2005, 3 pages.

(Continued)

*Primary Examiner* — Eleni Shiferaw
*Assistant Examiner* — Hilary Branske
(74) *Attorney, Agent, or Firm* — Sheridan Ross P.C.

(57) ABSTRACT

A recursive based approach to key generation produces keys for encrypted communication. Simple mathematical operations are utilized with the inherent uncertainty of an interactive process between two endpoints to establish a common secret key. The uncertainty-based key cipher starts with some public information and some private information. The public information includes a vocabulary (alphabet) and keypad, and the private information can include an authentication code. The keypad is an abstraction that represents, for example, a set of "buttons." These buttons will be used to translate a working key into a text that could be used to evaluate coincidences in a generated working key. Each keypad button can have more than one possible value. The number of options inside the button is the so called "uncertainty level."

5 Claims, 7 Drawing Sheets

OTHER PUBLICATIONS

"Gilles Brassard," Wikipedia, the free encyclopedia, available at http://en.wikipedia.org/wiki/Gilles_Brassard, printed Feb. 9, 2008, 1 page.

"Grover's Algorithm," Web's Biggest website, available at http://web.archive.org/web/20050124140826/http://dirs.org/wiki-article-tab.cfm/grover_s_algorithm, 2005, 3 pages.

"Index of Coincidence," Wikipedia, the free encyclopedia, available at http://en.wikipedia.org/wiki/Index_of_coincidence, printed Feb. 9, 2008, 5 pages.

"Kasiske Examination," Wikipedia, the free encyclopedia, available at http://en.wikipedia.org/wiki/Kasiski_examination, printed Feb. 9, 2008, 2 pages.

"Quantum Money," Universitat Klagenfurt, available at http://cs-exhibitions.uni-klu.ac.at/index.php?id=258, printed Feb. 9, 2008, 1 page.

"Shor's Algorithm," Web's Biggest website, available at http://web.archive.org/web/20050517230802/http://dirs.org/wiki-article-tab.cfm/shor_s_algorithm, 2005, 7 pages.

"Social Engineering," Wikipedia, the free encyclopedia, available at http://en.wikipedia.org/wiki/Social_engineering_(computer_security), printed Feb. 9, 2008, 8 pages.

Atreya, M., "Introduction to Cryptography," RSA Security, 2005, available at http://web.archive.org/web/20050129033901/http://www.rsasecurity.com/products/bsafe/overview/IntroToCrypto.pdf, 7 pages.

Benenti, G. et al., *Principles of Quantum Computation and Information*, 2004, World Scientific Publishing Co., Hackensack, New Jersey.

Brassard, G. et al., "Cryptology Column—25 Years of Quantum Cryptography," Universite de Montreal, Canada, 1996, 12 pages.

Carter, J. et al., "Universal Classes of Hash Functions," Proceedings of the Ninth Annual ACM Symposium on Theory of Computing, 1977, available at http://www.arl.wustl.edu/~sailesh/download_files/Limited_Edition/hash/Universal%20classes%20of%20hash%20functions%20(Extended%20Abstract).pdf, pp. 106-112.

Comon, H. et al., "Is It Possible to Decide Whether a Cryptographic Protocol is Secure or Not?" Journal of Telecommunications and Information Technology, Apr. 2002, vol. 4, pp. 3-13.

Cragon, H. et al., *Computer Architecture and Implementation*, Cambridge University Press, 2000, Cambridge, New York.

Czarnecki, L., "Quantum Physics," available at http://www.hpwt.de/Quantene.htm, last updated Aug. 23, 2001.

Deutsch, D. et al., "Rapid Solution of Problems by Quantum Computation," Proceedings of the Royal Society of London A, 1992, vol. 439, pp. 553-558.

Deutsch, D., "Quantum Theory, the Church-Turing Principle and the Universal Quantum Computer," Proceedings of the Royal Society of London A, 1985, vol. 400, pp. 97-117.

Ritter, T., "CBC," Ritter's Crypto Glossary and Dictionary of Technical Cryptography, 1999, available at http://web.archive.org/web/20010723145913/http://www.hackpalace.com/encryption/general/glossary.html#CBC, 2 pages.

Ritter, T., "Codebook Attack," Ritter's Crypto Glossary and Dictionary of Technical Cryptography, 1999, available at http://web.archive.org/web/20010723145913/http://www.hackpalace.com/encryption/general/glossary.html#CodebookAttack, 2 pages.

Ritter, T., "Cryptanalysis," Ritter's Crypto Glossary and Dictionary of Technical Cryptography, 1999, available at http://web.archive.org/web/20010723145913/http://www.hackpalace.com/encryption/general/glossary.html#Cryptanalysis, 2 pages.

Rompel, J., "One-Way Functions Are Necessary and Sufficient for Secure Signatures," Proceedings of the Twenty-Second Annual ACM Symposium on Theory of Computing, 1990, pp. 387-394.

Scheider, W., "Do the 'Double Slit' Experiment the Way it Was Originally Done," originally published in The Physics Teacher, 1986, vol. 24, pp. 217-219, available at http://www.cavendishscience.org/phys/tyoung/tyoung.htm.

Singh, S., *The Code Book*, Anchor Books a division of Random House, 1999, New York.

Weisstein, E., "One-Way Function," from MathWorld—A Wolfram Web Resource, http://mathworld.wolfram.com/One-WayFunction.html, (printed Jul. 28, 2010).

Yan, S., *An Introduction to Formal Languages and Machine Computation*, World Scientific Pub. Co. Inc., 1996.

\* cited by examiner

UNCERTAINTY-BASED KEY AGREEMENT PROTOCOL

RELATED APPLICATION DATA

This application claims the benefit of and priority under 35 U.S.C. §119(e) to U.S. Provisional Application No. 60/948,806, filed Jul. 10, 2007, entitled "UNCERTAINTY-BASED KEY AGREEMENT PROTOCOL," which is incorporated herein by reference in its entirety.

BACKGROUND

Several cryptographic algorithms are widely available in the marketplace today. The particularities of each algorithm generally make them more suited for one particular application or another. The majority of today's algorithms are based on mathematical concepts such that the current computers are unable to decrypt the ciphered messages. They are based on a so called one-way mathematical function which by hypothesis is easy to use, but hard to be broken.

A function is called a "one-way" function if the following three conditions are simultaneously satisfied:

1. The description off is publicly known and does not require any secret information for its operation;
2. Given x, it is easy to compute f(x);
3. Given y, in the range off, it is too hard defined x such that f(x)=y;

By definition, one way functions are fairly simple. They receive input, generate a result, and from that result it is difficult to identify what the original factors were. One could run the function for all possible input values until the same set of results is found and thus identify the original factors, provided there is not more than one set of inputs which generates the same result.

A one-time pad system is another simple and efficient strategy that can be used as a basis for providing a secure communication between endpoints. The mathematical side of the one-time pad algorithm is simple XOR operation. While it is a simple procedure, it was the first known unconditionally secured encryption system designed. While the majority of the algorithms are secure because of the lack of computational resources to break their ciphers, the one-time pad uses more abstract concepts than math to provide an increase in security.

The one-time pad cipher trusts in a completely random sequence of encryption keys, shared by the end-points. The key is basically a sequence of bits that have the same size as the message to be sent and is used to hide its content. Assuming that M is the message and K is the key, the result of M XOR K (bit-to-bit) is the encrypted text.

The one-time pad system is known as unbreakable because once for each message, a different random key is used for its encryption, and there is no way to find a pattern in the decrypted messages.

Diffie-Hellman provided a solution to provide or share secrets on a public communications channel. The introduced method has been used for years in order to generate a common secret key among endpoints.

SUMMARY

Generally speaking, luck can be translated into probability. An initial assumption is that two keys are going to be generated in different computers, with no common interaction between them. If this is the case, it would be feasible to assume that coincident digits, in the same position, will be found between the two keys.

Assume Alice and Bob will generate their keys as a long number (several decimal digits). Those numbers will have as many digits as desired, as long as Alice and Bob agree about a common length. There are two probabilities that should be evaluated in order to check if the seed keys will be composed by coincident digits:

1. What are the odds that no digits at all with the same value are at the same position in both keys?
2. What are the odds to find at least one digit at the same position with the same value in both keys?

In relation to the first question, the technique works at least with decimal numbers. This means that at each position, there are, for example, ten possible values. If it is required that no digits at all are at the same position with the same value, assuming that number "1" is at the first position of Bob's working key, Alice could have any other number in her key but "1." The probability that Alice has a different number is $9/10$ths. Determining this probability for all other digits, the final result would be:

$$9/10ths \times 9/10ths \times \ldots \times 9/10ths = 9/10ths^n$$

where n is the number of digits in the key.

Thus, in order to evaluate how easy it would be to have no matching number at all in either key, the associated probability is very small and it serves as an indication that this event is unlikely to occur. In fact, since the probability converges linearly to zero in power, the likelihood of the occurrence is very small.

In relation to question 2, what are the odds to encounter at least one single digit in both keys at the same position? This is the opposite of the previous question and it is logical to predict that the probability of finding two or more single same digits in the same position is smaller than for just one. Suppose that Bob has "1" at the first seed position. For Alice, the probability of obtaining "1" is $1/10^{th}$. For the remaining (n−1) digits, Alice has $9/10$ths probability for obtaining the same digit. Therefore, the desired probability is:

$$1/10^{th} \times (9/10ths)^{(n-1)}$$

This probability is smaller than that determined from the answer of question 1.

An exemplary aspect of the present invention is directed toward uncertainty-based key agreement protocols. One exemplary use of this protocol is the ability to create a secure communications protocol that can, for example, work in conjunction with TCP/IP networks. The system is believed to not require increased computational resources proportional to the security needs, and is not required to trust one-way functions.

The exemplary uncertainty-based key cipher starts with some public information and some private information. The public information includes a vocabulary (alphabet) and keypad, and the private information can include an authentication code. The keypad is an abstraction that represents, for example, a set of "buttons." These buttons will be used to translate a working key into a text that could be used to evaluate coincidences in a generated working key. Each keypad button can have more than one possible value. The number of options inside the button is the so called "uncertainty level." Thus, one character of a private key can be translated by a button and a button has at least two possible values. This means that the translated string has an uncertainty level of "2." A hacker who intercepts the translated character would thus have two possible source values. This will be an important aspect of the security of the technique as will be appreciated hereinafter. The alphabet, or vocabulary, can be found to include any alpha numeric grouping, and for ease of discussion, will be selected as digits [0, 1, 2, 3, 4, 5, 6, 7, 8 and 9].

The authentication code supplied by a user will be used during the first iteration of the key exchange, as discussed hereinafter, and will be replaced by the outcome of the iteration right before the next one. This technique adds entropy to the system that will make the system more secure against codebook type attacks. Furthermore, since the remaining ciphered text may not always be long enough to be used on the next iteration of the authentication code, a "reset authentication code" procedure can be used in conjunction with the techniques disclosed herein to create a hash function in order to create an authentication code with an appropriate length.

In general, the exemplary steps associated with determining an uncertainty-based key are:

1. Inputting an authentication code at each endpoint;
2. Each end of the communication create a blank session key and agree about a session key size;
3. Each end of the communication share a common alphabet;
4. Each end of the communication share a common keypad;
5. Each end of the communication generates a local working key;
6. Each end of the communication translates its own key by using the common keypad and generating a local translated key;
7. Each endpoint of the communication ciphers its local translated key with a local working key and authentication code, generating the ciphered translated key;
8. The ciphered translated keys are exchanged between the endpoint;
9. The translated keys received are deciphered with the local working keys and authentication code generating a remote translated key;
10. A drop string is found locally by comparing the local translated key and the remote translated key;
11. The bad entries are dropped using the drop string;
12. The working key is appended with the remaining digits of the session key;
13. An authentication code value is reset (if needed) based on the output of the last ciphered translated key;
14. If the session key size is large enough, the process ends; and
15. If the key size needs to be larger, the process continues back to step 5.

Accordingly, an exemplary aspect of the invention is directed toward key generation.

Still further aspects of the invention are directed toward key generation based on uncertainty.

Additional aspects of the invention are directed toward realizing an established key size, alphabet and keypad to generate a working key.

Still further aspects of the invention relate to a recursive procedure utilized to generate a working key of sufficient length.

Still further aspects of the invention are directed key generation that is more computationally efficient and more suited for computationally compromised devices.

These and other features and advantages of this invention are described in, or are apparent from the following detailed description of the exemplary embodiments. The embodiments and configurations herein are neither complete nor exhaustive. As will be appreciated, other embodiments of the invention are possible utilizing alone or in combination, one or more of the features as set forth above or described in detail below.

BRIEF DESCRIPTION OF THE DRAWINGS

Exemplary embodiments of the invention will be described in detail, with reference to the following figures wherein.

DETAILED DESCRIPTION

Figure 1:
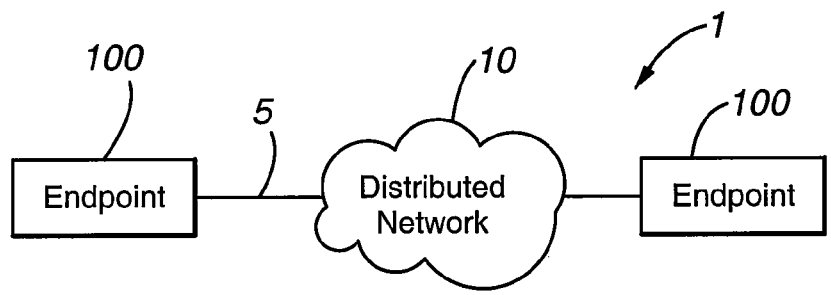
FIG. 1 illustrates an exemplary communication system.

An exemplary embodiment of this invention will be described in relation to key generation in a communications environment. However, it should be appreciated that in general, the systems, methods and techniques of this invention will work in any environment and in conjunction with any communication protocol or infrastructure or network. The system could also be independently used for key generation.

The exemplary systems, methods and techniques of this invention will also be described in relation to key generation hardware, software, and/or communication endpoints. However, to avoid unnecessarily obscuring the present invention, the following description omits well-known structures, network components, and devices that may be shown in block diagram form, are well known, or are otherwise summarized.

For purposes of explanation, numerous details are set forth in order to provide a thorough understanding of the present invention. It should be appreciated however that the present invention may be practiced in a variety of ways beyond the specific details as set forth herein.

Furthermore, while the exemplary embodiments illustrated herein show various components of the system collocated, or associated with a particular endpoint, it should be appreciated that the various components of the system can be located at distant points of a distributed network, such as a telecommunications network and/or the Internet, or within a dedicated, secure or unsecured and/or encrypted system. Thus, it should be appreciated that the components of the system can be combined into one or more devices, such as an encrypted communication system, or collocated on a particular node of a distributed network, such as an analog and/or digital network. As will be appreciated from the following description, and for reasons of computational efficiency, the components of the system can be arranged in any location within a distributed network without affecting the operation of the system. For example, the various components could be located or replicated at two separate endpoints of a communications channel. Similarly, one or more functional portions of the system could be distributed between a communications device and an associated computing device.

It should also be appreciated that the various links, including any communications channels and their various links 5, connecting the elements, can be wired or wireless links, or any combination thereof, or any other well-known or later developed element(s) that is capable of supplying and/or communicating data to and from the connected elements.

The term module as used herein can refer to any known or later developed hardware, software, firmware, fuzzy logic, expert system, neural network or combination thereof that is capable of performing the functionality associated with that element. The terms determined, calculate and compute and variations thereof, as used herein are interchangeable and include any type of methodology, process, mathematical operation or technique. Furthermore, it is to be noted that the term "a" or "an" entity refers to one or more of that entity. As such, the terms "a" or "an", "one or more" and "at least one" can be used interchangeably herein. It is also to be noted that the terms "comprising", "including" and "having" can be used interchangeably.

Also, while the flowcharts have been discussed and illustrated in relation to a particular sequence of events, it should be appreciated that changes, additions, and omissions to this sequence can occur without materially affecting the operation of the invention.

As will be appreciated, the communication system 1 can also comprise other well known components which will not be described herein in detail. For example, the system can further include one or more switches/media servers that can be of any architecture for directing communications to one or more devices. The links connecting the elements can utilize one or more networks that can typically include proxies, registers, switches and routers that are well known.

FIG. 1 illustrates an exemplary communications network that can be used in conjunction with the present invention.

While the communication system 1 illustrated in FIG. 1 is shown as having two endpoints 100 connected with links 5 and one or more distributed networks 10, it should be appreciated that the systems, methods and techniques of this invention will work in any communications environment between any two communication endpoints or devices.

Figure 2:
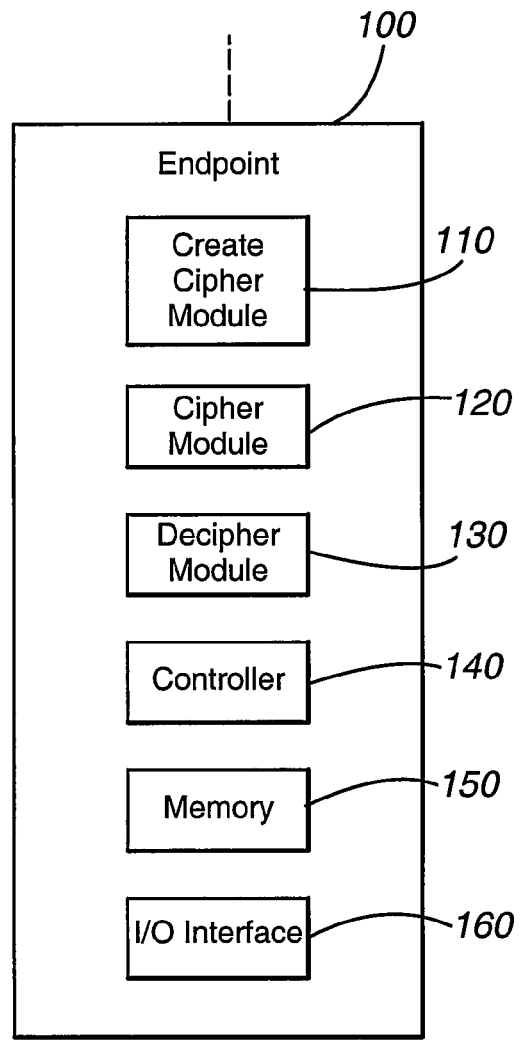
FIG. 2 illustrates an exemplary endpoint of the communication system including various modules for key generation according to this invention.

FIG. 2 illustrates in greater detail one of the exemplary endpoints 100. In particular, the endpoint 100 comprises a create cipher module 110, a cipher module 120, a decipher module 130, a controller 140, a memory 150 and an I/O interface 160.

In operation, and at each endpoint, an authentication code is input into the create cipher module 110, and stored in memory 150. As will be appreciated, this input authentication code can be exchanged over a network prior to input to the endpoint or at some other point in time or via some other means. The effect of exchanging the authentication code over the network prior to input to each endpoint is the increased network burden. The authentication code also only needs be used in the first step of the key generation technique and there is no requirement for the disclosed technique to exchange this information. The authentication code could be viewed as a personal password—if the password is lost, communication security could be compromised.

Next, each endpoint, and in particular each create cipher module 110 at each endpoint, establishes a session key size, a blank session key, a common alphabet and a common keypad. The key size, alphabet and keypad can be agreed upon in advance and need not necessarily be generated for each instance of the key size generation. Next, each endpoint generates a working key. Then, each endpoint translates its own key using the keypad and generates a local translated key. Then, in conjunction with the cipher module 120, each endpoint ciphers the local translated key with the local working key and authentication code, and generates a ciphered translated key.

With the assistance of one or more links 5 and distributed network 10, the endpoints then exchange the locally determined cipher translated key. Next, each endpoint deciphers, in conjunction with the decipher module 130, the received ciphered translated key using the endpoints' local working key and authentication code, and generates the remote translated key. A comparison of the local translated key and remote translated key is then performed to determine the drop string. Bad entries are dropped and the remaining digits of the working key are appended to the session key. The authentication code is then updated based on the last ciphered translated key and a determination is made if the key size is large enough. If the key size is large enough, the session key becomes the system output. Otherwise, control will return such that each endpoint generates a new working key.

Figure 3:
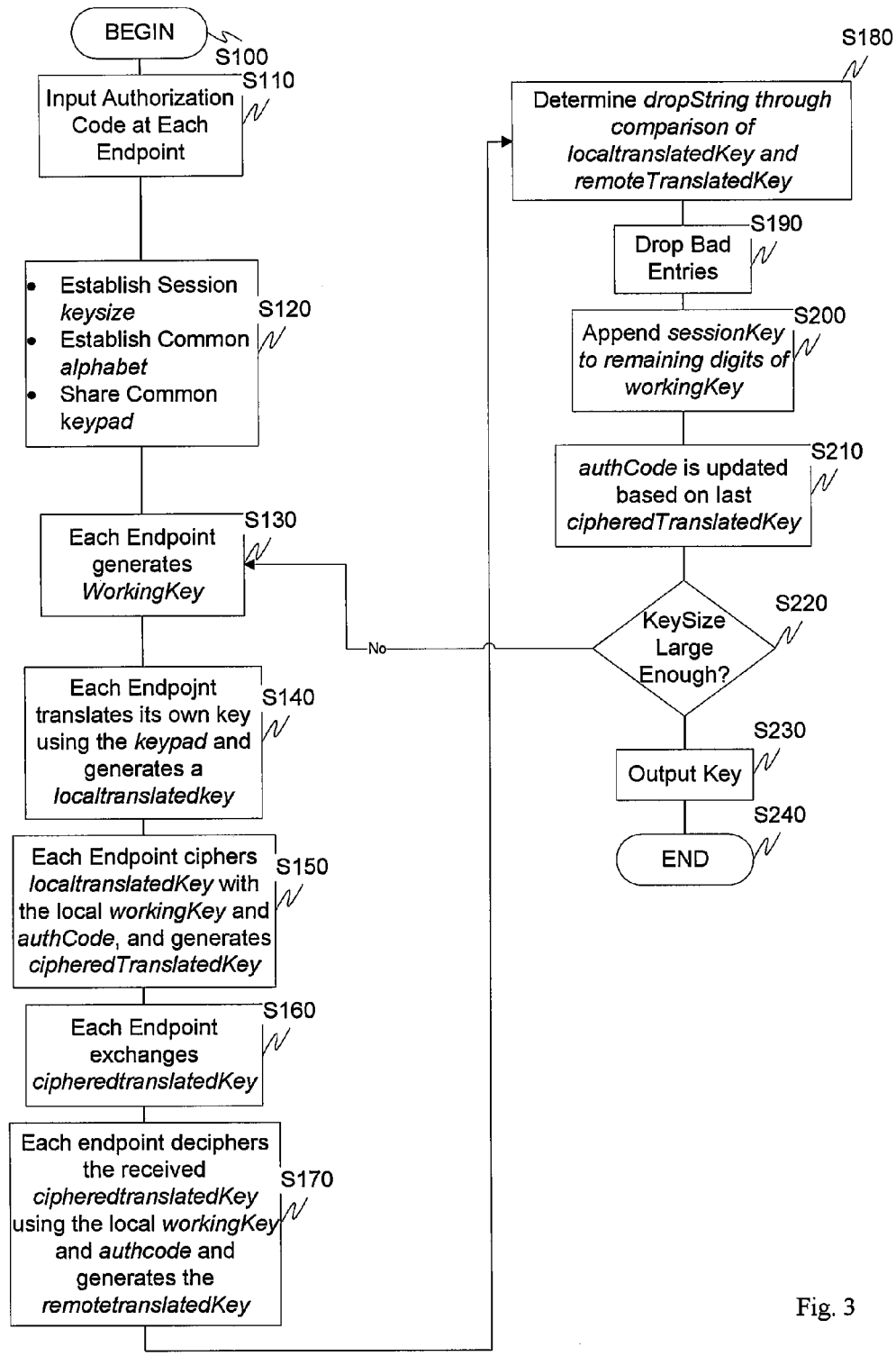
FIG. 3 is a flowchart illustrating an exemplary process for generating a working key according to this invention.
Figure 4:
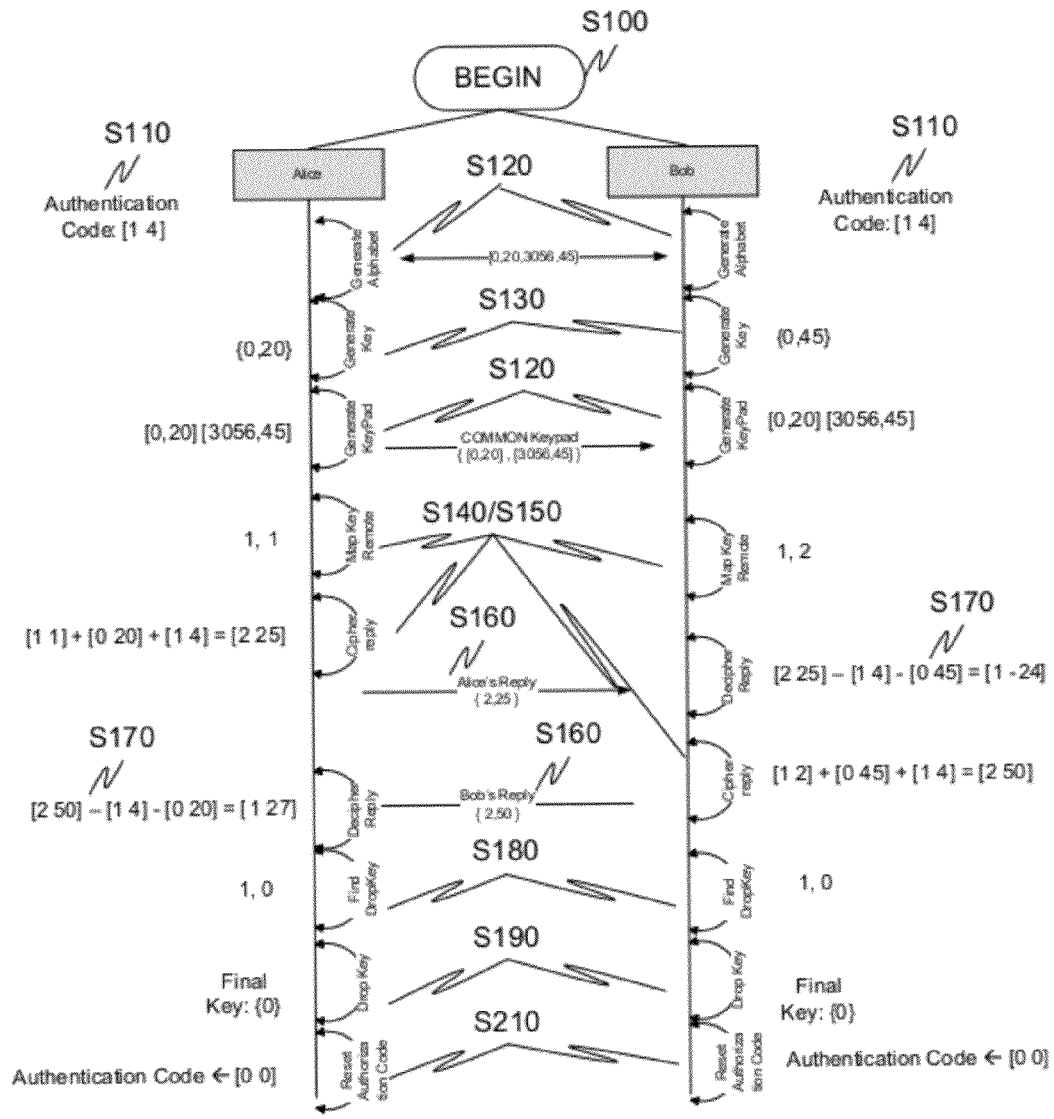
FIG. 4 is an exemplary unified modeling language diagram showing the interaction between Alice and Bob according to this invention.

FIGS. 3 and 4 illustrate the exemplary method for generating a key in accordance with this invention. In particular, control begins in step S100 and continues to step S110. In step S110, an authentication code is received at each endpoint. Next, in step S120, the session key size, common alphabet and common keypad are one or more of agreed upon, shared, established, retrieved or communicated to each other. An empty session key is also created. Then, in step S130, each endpoint generates a working key. Control then continues to step S140.

At step S140, each endpoint translates its own key using the shared common keypad and generates a local translated key. Next, in step S150, each endpoint ciphers the local translated key with the local working key and authentication code, and generates the ciphered translated key. Then, at step S160, each endpoint exchanges the ciphered translated key. Control then continues to step S170.

In step S170, each endpoint deciphers the received ciphered translated key using the local working key and authentication code and generates the remote translated key. Next, in step S180, the drop string is determined through comparison of the local translated key. Then, in step S190, the bad entries are dropped. Control then continues to step S200.

In step S200, the remaining digits of the working key are appended to the session key. Next, in step S210, the authentication code is updated based on the last translated key. Then, in step S220, a determination is made whether the key size is large enough. If the key size is large enough, control jumps to step S230. Otherwise, control continues back to step S130.

In step S230, the key is output. The key can then be used for, for example, secure communication between endpoints. Control then continues to step S240 where the control sequence ends.

As mentioned, a user can be queried for an authentication code in step S110. The authentication code can be used during the first iteration of the key exchange and can be replaced by the outcome of the iteration right before the next iteration. This procedure adds entropy to the system that can make the system more secure against codebook attacks. Since the remaining cipher text are not always long enough to use on the next iteration, a reset authentication code procedure can optionally be used in conjunction with the technique to create a hash function in order to create an authentication code with the proper length.

Figure 5:
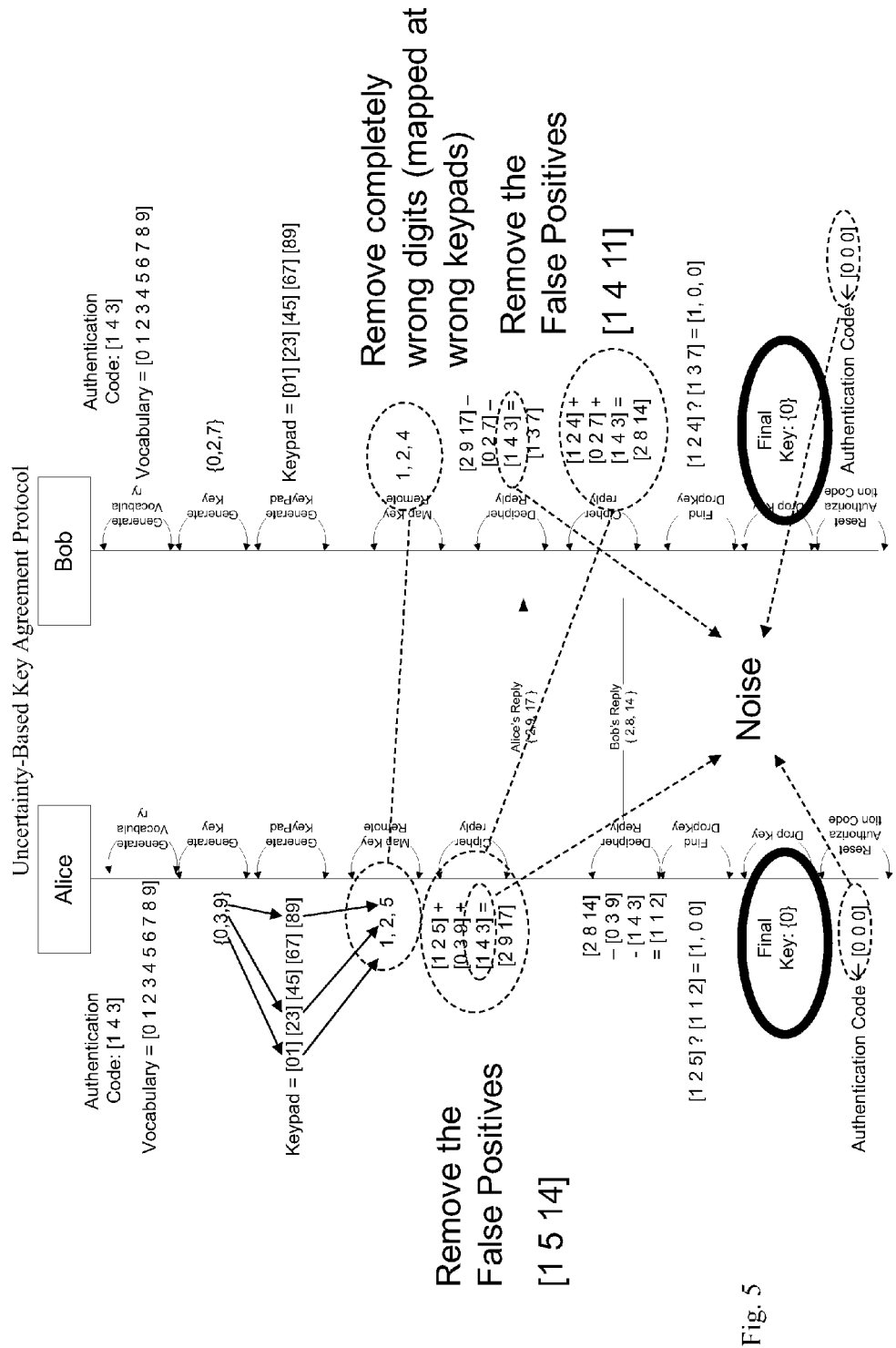
FIG. 5 is a more detailed unified modeling language diagram of the interchange between Alice and Bob according to this invention.

The authentication code can be based on the following pseudo-code procedures. First, the functions that relate to the ciphering and deciphering processes:

Vector cipher (Vector: workingKey, Vector: translatedKey, Vector:authcode)
    Vector: buff<[ ]
Num: value
    For each element in workingKey
    Begin
        value<current element in workingKey+current element in translatedKey +current element in authCode Append value to buff
End
Return buff
Vector decipher (Vector: workingKey, Vector: translatedKey, Vector: authCode)
  Vector: buff<[ ]
Num: value
  For each element in workingKey
  Begin
    value<current element in workingKey–current element in translatedKey –current element in authCode
    Append value to buff
    Move to next element in workingKey and translatedKey
  End
  Return buff Two additional procedures relate to getting the authentication code from the user and resetting it after each communication cycle. Getting the authentication code from the user can be simple and dependent on a user interface. The procedure to reset the authentication code can be described as:

Vector: resetAuthenticationCode (Vector: lastText, Num: keySize)
Num: mySeed
Vector: buff
mySeed←Sum of all elements in lastText
Set the System random number generator seed with mySeed
Until buff size is smaller than keySize
Begin
Append next number from the system random number generator to buff
End
Return buff FIG. 5 illustrates an exemplary key generation technique between Alice and Bob. Similar steps to those discussed in relation to FIGS. 3 and 4 are used with, in this example, random noise introduced to further enhance security.

A codebook attack would use a pre-built table with all possible combinations of source values, keys and ciphered text. Since all source values (alphabet) and key values (keypad) are know in advance, a code book table could be created for all possible combinations of alphabet X keypad values X ciphered text. With the codebook table available, the exchanged ciphered text could be used to deduce its source respective source value. By adding noise to the system (authorization code), it prevents this type of attack because there is no way to guess in advance what the authentication code is. This way, an attacker does not have enough information to build a codebook table.

In particular, both Alice and Bob have the authentication code [1 4 3]. Additionally, both Alice and Bob have agreed on a vocabulary, and in this exemplary scenario the vocabulary is [0 1 2 3 4 5 6 7 8 9]. Both Alice and Bob, respectively, generate a local working key. For Alice, the local working key is {0, 3, 9} and for Bob, the local working key is {0, 2, 7}. Using the common (previously agreed upon) keypad {[0 1] [2 3] [4 5] [6 7] [8 9]}, each endpoint translates its own local working key using the common keypad thus generating a local translated key. In this instance, for Alice, 0 maps to position 1 on the keypad, 3 maps to position 2 and 9 maps to position 5. Thus, for Alice, the local translated key is {1, 2, 5}. In a similar manner, 0 of the local working key for Bob is mapped to position 1, 2 is mapped to position 2, and 7 is mapped to position 4. Thus, the local translated key for Bob is {1, 2, 4}. Having the local translated key, the local working key and the authentication code, each side ciphers the three to produce the ciphered translated key. For Alice, the ciphered translated key is [2 9 17] and for Bob the ciphered translated key is [1 3 7].

For the local translated key, the wrong digits are removed, i.e., the digits that were mapped to the wrong keypads.

As each side ciphers the local translated key with the local working key and the authentication code, the false positives are removed. For Alice, the false positives are [1 5 14] and for Bob, the false positives are [1 4 11].

Alice then sends to Bob the ciphered translated key and Bob similarly sends to Alice the ciphered translated key. Each side then respectively deciphers the translated keys using the local working keys and authentication code thus generating the remote translated key. In this particular example, for Bob, the ciphered translated key generated by Alice is deciphered in conjunction with Bob's local working key [0 2 7] and the authentication code leaving Bob's remote translated key as [1 3 7].

For Alice, Bob's ciphered translated key [2 8 14] is deciphered with the local working key [0 3 9] and the authentication code [1 4 3] leaving Alice's remote translated key of [1 1 2].

Each endpoint then finds the drop string by comparing their respective local translated key and the remote translated key. For Alice, the local translated key [1 2 5] is compared to the remote translated key [1 1 2] leaving the dropped string [1 0 0].

In a similar manner, Bobs local translated key [1 2 4] is compared with Bobs remote translated key [1 3 7] leaving a drop string for Bob of [1 0 0].

This comparison yields a session key for Alice of {0} and for Bob {0} which is identified as the session key if the key size needs more numbers, otherwise it is the final key as illustrated in FIG. 5. The authentication code can then optionally be reset as discussed and receive a new value based on the output of the last ciphered translated key.

In an effort to gauge performance of the above technique, the key generation process of the current invention was compared with the Diffie-Hellman technique. Diffie-Hellman requires very long prime numbers in keys. In general, Diffie-Hellman uses extended precision functions from mathematical libraries in order to perform power and module operations that, in all instances, all time and memory consuming.

While the following is not required, it provides performance benefits as opposed to exchanging and developing alphabets, working keys and keypads on the fly, or in real-time over a network. In one exemplary implementation, the alphabet was defined as static and comprised, as discussed above, by digits {0 1 2 3 4 5 6 7 8 9}. Additionally, working keys were generated with at least 60 decimal digits and the keypad, again, was static and composed by the following buttons {[0 1] [2 3] [4 5] [6 7] [8 9]}.

The alphabet was set to single decimal digits, thus making the comparison to Diffie-Hellman more accurate. Moreover, decimal digits can be used as the basic unit, with one implementation using an integer, as a basic unit, with an integer being able to hold values much larger than one single decimal digit. Another benefit of using a static alphabet and keypad is the network usage benefit since there is no necessity of exchanging a new vocabulary and/or keypad for every session.

The working key size can optionally be chosen to have the same size as the message to be ciphered by the one-time pad system. For short messages, there could be very few digits to be compared between the end-points. Since there are much better odds on finding matches between keys with longer sets of digits, this feature makes the process considerably faster. The final key could demand several cycles of the technique in order to complete its length. If a long enough working key can assure at least one match per cycle, the maximum number of cycles could be the length of the final key.

Figure 6:
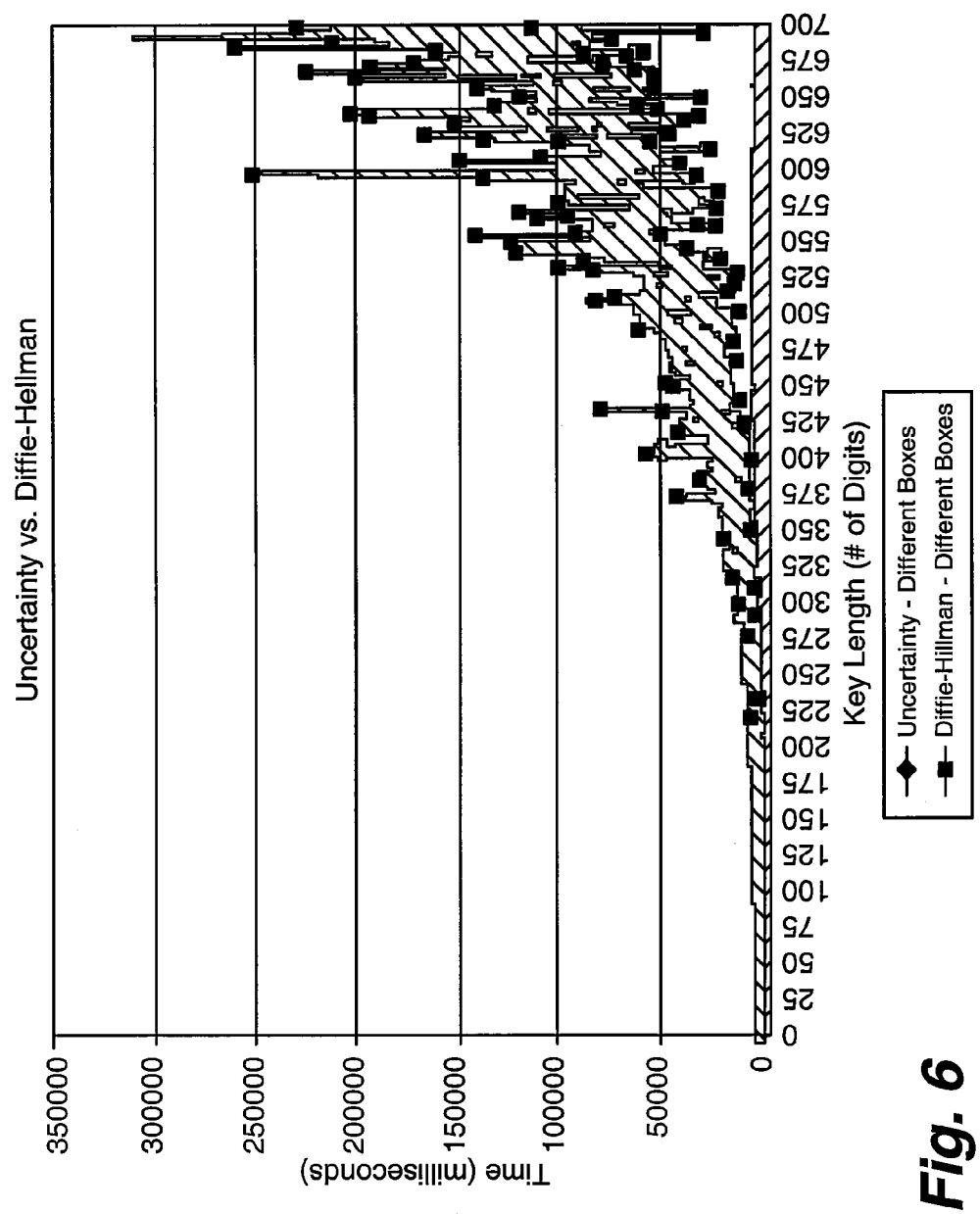
FIGS. 6-8 illustrate exemplary computational benefits associated with this invention.
Figure 7:
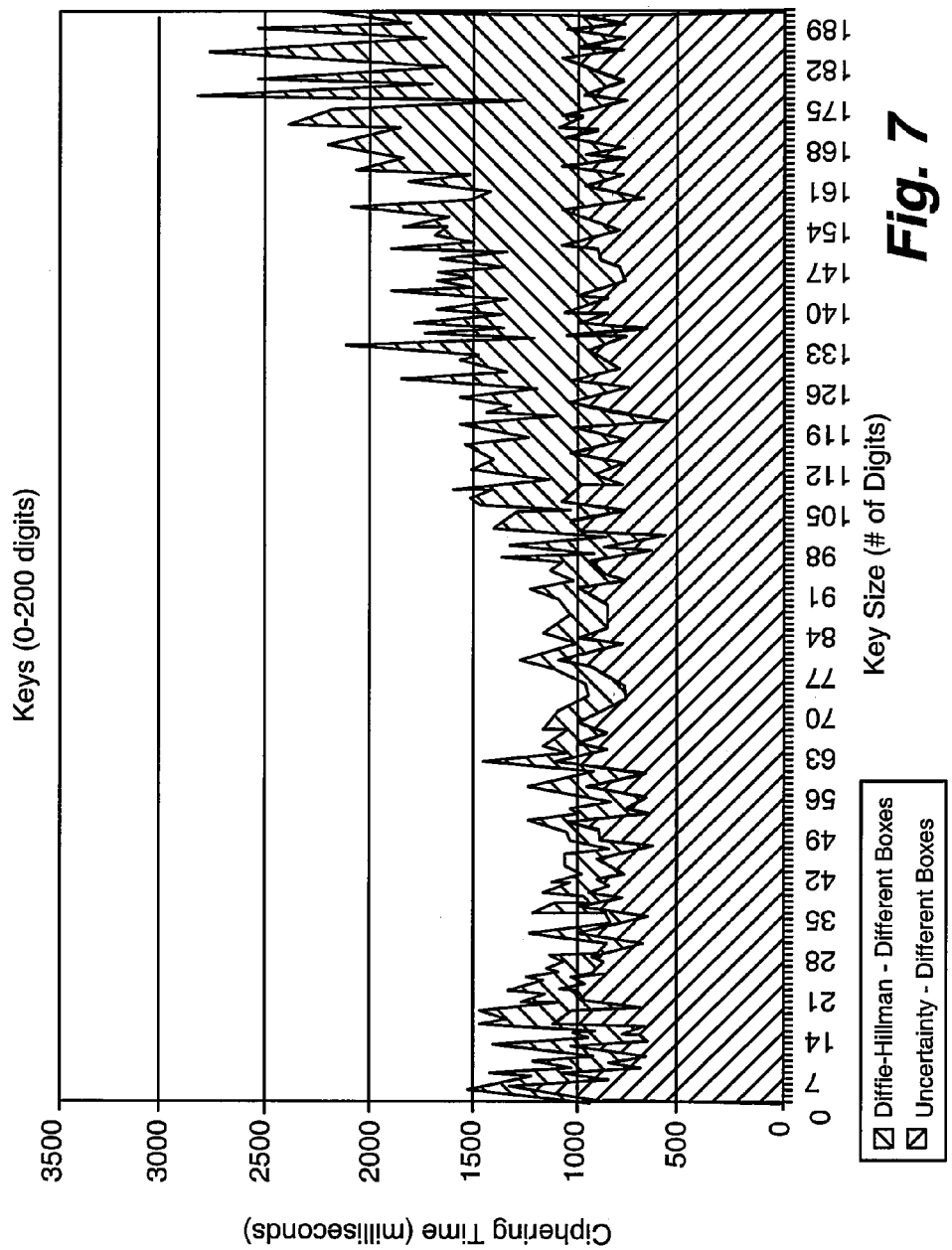
Figure 8:
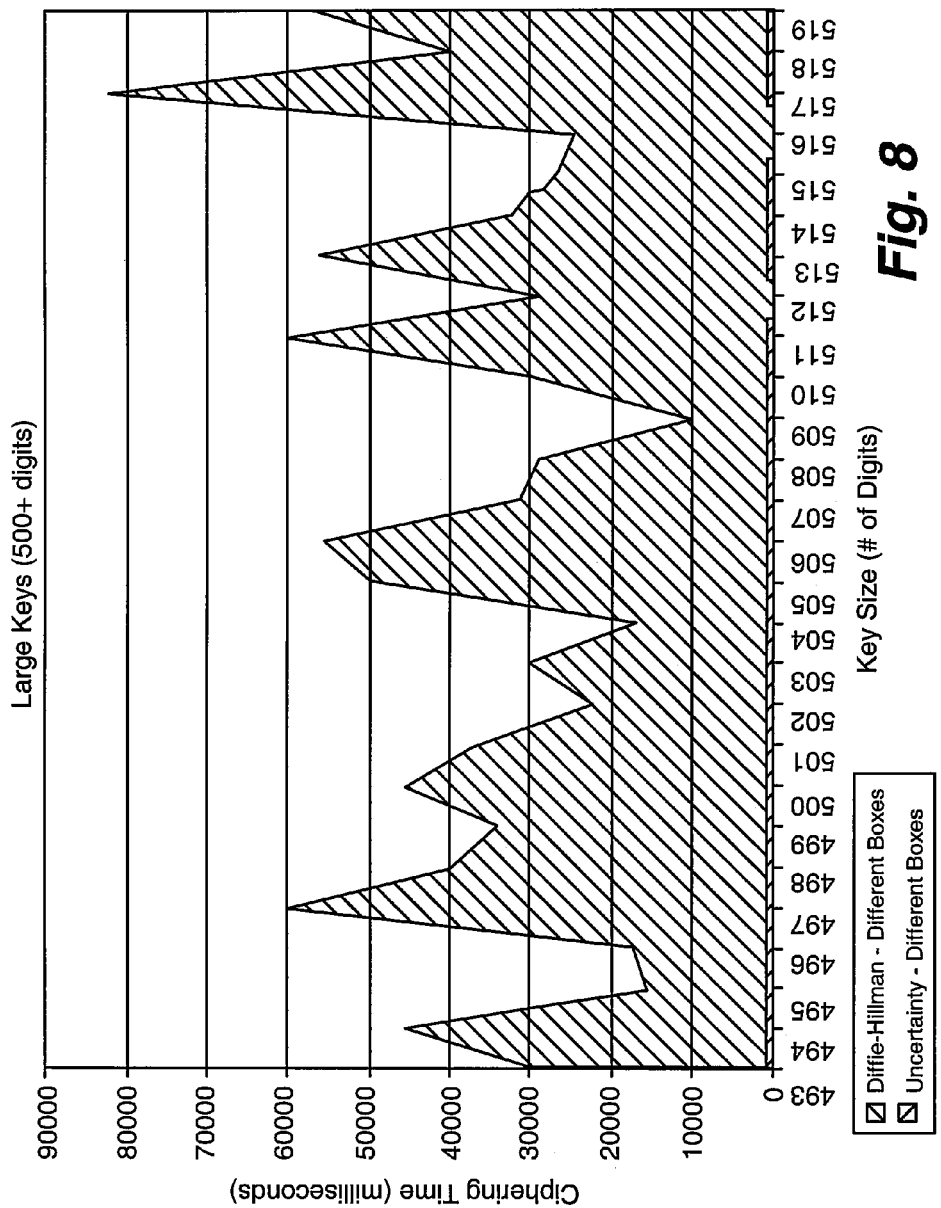

FIGS. 6-8 illustrate exemplary comparisons between the techniques of the invention compared with the Diffie-Hellman technique. In FIG. 6, the comparison between the uncertainty-based approach and the Diffie-Hellman approach was conducted with keys generated in sequential order from 1-700 decimal digits. As illustrated, the performance of the present uncertainty-based system was much better than the Diffie-Hellman approach. As the keys became larger, and thus more secure, the delta between the methods widened. One reason why the present uncertainty-based technique performs so much better than Diffie-Hellman for larger keys is because the calculations for Diffie-Hellman scale according to the length of the key, while the uncertainty-based technique uses much simpler arithmetical operations which demand much lower computational resources. The probability of getting at least one digit per iteration is higher with longer key lengths. At the same time, the mathematical operations required by Diffie-Hellman make it nearly impossible for an average computer to calculate keys longer than 700 digits.

In FIG. 7, it is illustrated where the breaking point is between utilizing a Diffie-Hellman approach and the present uncertainty approach. On keys with at least 70 digits, an on the exemplary system tested, the exemplary uncertainty-based approach has certain advantages. For example, on an exemplary computer system, and comparing to the Diffie-Hellman approach, the Diffie-Hellman algorithm stopped processing due to processor overheat with a key of 710 digits. However, as illustrated in FIG. 8, while Diffie-Hellman required more than a minute to define a key with 517 digits, the uncertainty-based approach required less than 1 second.

FIG. 8 illustrates an exemplary comparison on an exemplary computer system of the ciphering time against the key size. From the graph in FIG. 8, it can be seen that the Diffie-Hellman technique takes considerably longer than the uncertainty-based approach of the present invention.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s) or means.

Additionally, the systems, methods and techniques of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as telecommunications endpoint, any comparable means, or the like. In general, any device capable of implementing a state machine that is in turn capable of implementing the methodology illustrated herein can be used to implement the various methods and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present invention, systems and methods for key generation. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A key generation system comprising:
at least two communications system endpoints, each endpoint including a controller, each endpoint:
agreeing upon an authentication code;
agreeing upon a vocabulary;
agreeing upon a keypad, the keypad being an abstraction that represents a set of buttons, the buttons used for translation, with each keypad button having more than one possible value, the number of values being an uncertainty level; and
comprising a create cipher module and control that utilize the keypad to translate a local working key such that coincidences with a generated remote translated key can be evaluated, wherein the endpoints agree upon a keysize, wherein a key generation technique is repeated until an agreed upon keysize is reached, wherein the translated local working key results in a local translated key, wherein a cipher module is adapted to cipher the local translated key with the local working key and authentication code to produce a ciphered translated key, further comprising an I/O interface that allows each endpoint to exchange its respectively generated ciphered translated key, further comprising a deciphering module at each endpoint adapted to decipher the received ciphered translated key using the local working key and authentication code to generate respective remote translated keys.

2. The system of claim 1, wherein the authentication code is updated.

3. The system of claim 1, wherein the keypad has a plurality of buttons, with each button having more than one possible value, the number of values inside the button is proportional to an uncertainty level.

4. A uncertainty-based key generation method comprising:
   i. inputting an authentication code at a plurality of endpoints in a communication system, wherein each endpoint in the plurality of endpoints is a device that includes a controller;
   ii. each endpoint, using a controller, creating a blank session key and agreeing on a session key size;
   iii. each endpoint sharing a common alphabet;
   iv. each endpoint sharing a common keypad, the keypad being an abstraction that represents a set of buttons, the buttons used for translation, with each keypad button having more than one possible value, the number of values being an uncertainty level;
   v. each endpoint generating a local working key;
   vi. each endpoint translating its respective local working key by using the common keypad and generating a local translated key;
   vii. each endpoint ciphering its respective local translated key with its respective local working key and the authentication code, and generating respective ciphered translated keys;
   viii. exchanging the ciphered translated keys between the endpoints;
   ix. deciphering the exchanged ciphered translated keys with the local working keys and authentication code generating remote translated keys at each endpoint;
   x. each endpoint finding a drop string by comparing the local translated key and the remote translated key;
   xi. dropping the incorrect entries using the drop string;
   xii. appending remaining digits of the working key to a session key; and
   xiii. if the session key size is large enough, the process ends, or
   xiv. if the session key size needs to be larger, the process continues back to step (v).

5. The method of claim 4, further comprising updating the authentication code.

* * * * *

UNITED STATES PATENT AND TRADEMARK OFFICE
CERTIFICATE OF CORRECTION

PATENT NO.        : 8,295,480 B1
APPLICATION NO.   : 11/860035
DATED             : October 23, 2012
INVENTOR(S)       : Luciano Godoy Fagundes It is certified that error appears in the above-identified patent and that said Letters Patent is hereby corrected as shown below:

At Column 10, line 47, after "endpoints," please insert --wherein-- therein.

At Column 10, line 48, after "point" please insert --is a device-- therein.

Signed and Sealed this
Twenty-sixth Day of February, 2013

Teresa Stanek Rea
*Acting Director of the United States Patent and Trademark Office*